(12) United States Patent
Zakuskin

(10) Patent No.: US 9,162,717 B2
(45) Date of Patent: Oct. 20, 2015

(54) TRUCK TRACK DRIVE

(75) Inventor: Yuriy Zakuskin, Orekhov (UA)

(73) Assignee: OAK Novations, Ltd., Middlesex, NJ (US)

( * ) Notice: Subject to any disclaimer, the term of this patent is extended or adjusted under 35 U.S.C. 154(b) by 426 days.

(21) Appl. No.: 13/350,912

(22) Filed: Jan. 16, 2012

(65) Prior Publication Data

US 2013/0181508 A1   Jul. 18, 2013

(51) Int. Cl.
| | | |
|---|---|---|
| *B62D 55/04* | (2006.01) | |
| *B62D 55/30* | (2006.01) | |
| *B62D 55/02* | (2006.01) | |
| *B62D 55/084* | (2006.01) | |

(52) U.S. Cl.
CPC ............ *B62D 55/04* (2013.01); *B62D 55/02* (2013.01); *B62D 55/084* (2013.01); *B62D 55/30* (2013.01)

(58) Field of Classification Search
CPC ........ B62D 55/04; B62D 55/14; B62D 55/24; B62D 55/30
USPC ......... 305/124, 125, 126, 127, 130, 132, 133, 305/143, 153, 154, 155; 301/6.5; 180/9.21, 180/9.26, 9.62, 65.6, 65.7, 65.51; 475/331, 475/343, 344, 346, 182, 185, 186, 195
See application file for complete search history.

(56) References Cited

U.S. PATENT DOCUMENTS

| | | | | |
|---|---|---|---|---|
| 1,101,212 | A * | 6/1914 | Merrit | 36/78 |
| 3,283,839 | A * | 11/1966 | Brown et al. | 180/8.2 |
| 4,078,452 | A * | 3/1978 | Rosler | 475/83 |
| 4,191,073 | A * | 3/1980 | Ritter, Jr. | 475/337 |
| 4,299,072 | A * | 11/1981 | Holstein | 53/306 |
| 4,988,329 | A * | 1/1991 | Lammers | 475/337 |
| 6,176,334 | B1 * | 1/2001 | Lorenzen | 180/9.48 |
| 2007/0119663 | A1 * | 5/2007 | Ha | 188/68 |
| 2008/0093134 | A1 * | 4/2008 | Frawley | 180/65.1 |

* cited by examiner

*Primary Examiner* — Kip T Kotter
*Assistant Examiner* — Jean Charleston

(57) ABSTRACT

A truck track drive can include two rollers. The truck track drive can also include a tread configured to pass over top and bottom of a dual rear wheel assembly on a truck and to be moved by rotation of the dual rear wheels. The track drive can also include a compulsory drive unit.

1 Claim, 8 Drawing Sheets

TRUCK TRACK DRIVE

Embodiments relate generally to track drives for vehicles, and, more particularly to a track drive for a truck.

In winter, trucks with dual rear wheels may be prone to losing traction on snow or ice.

One or more embodiments were conceived in light of the above-mentioned limitations or problems, among other things.

An embodiment can include a track drive apparatus for a truck having a track belt that passes around a rear wheel set (e.g., two wheels) and around a roller toward the forward end and a roller toward the backward end. The belt is kept in tension by a flexible rod coupled to both the front roller and the back roller.

Another embodiment can include a track drive for a truck having compulsory drive apparatus for driving the track drive tread from a chain and sprocket coupled to the wheel and the rear roller so as to be moved (or driven) by rotation of the vehicle tire.

DETAILED DESCRIPTION

In general, an embodiment can include a truck track drive that is driven by an existing wheel and tire of a vehicle, without a need to remove the wheel or tire. The truck track drive unit can fit around an existing dual rear wheel assembly of a truck and is powered by the rotation of the wheel/tire. Alternatively, a compulsory drive embodiment can be used.

Figure 1:
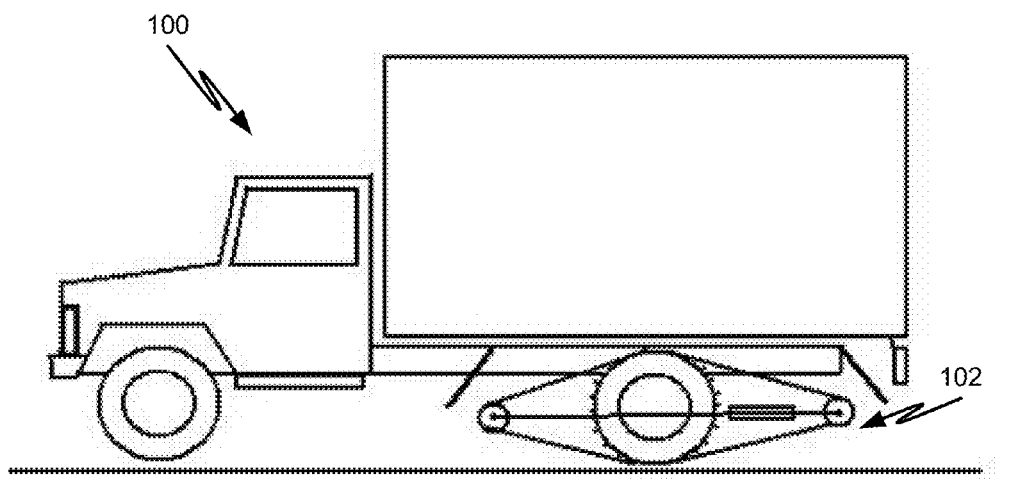
FIG. 1 is a diagram of a truck equipped with an exemplary track drives in accordance with at least one embodiment.

FIG. 1 shows a truck 100 equipped with an exemplary truck track drive 102. The track drive 102 is shown attached to the dual rear wheel assembly.

In operation, as the wheels of the truck 100 turn, tracks on each of the dual rear wheel assemblies are moved.

Figure 2:
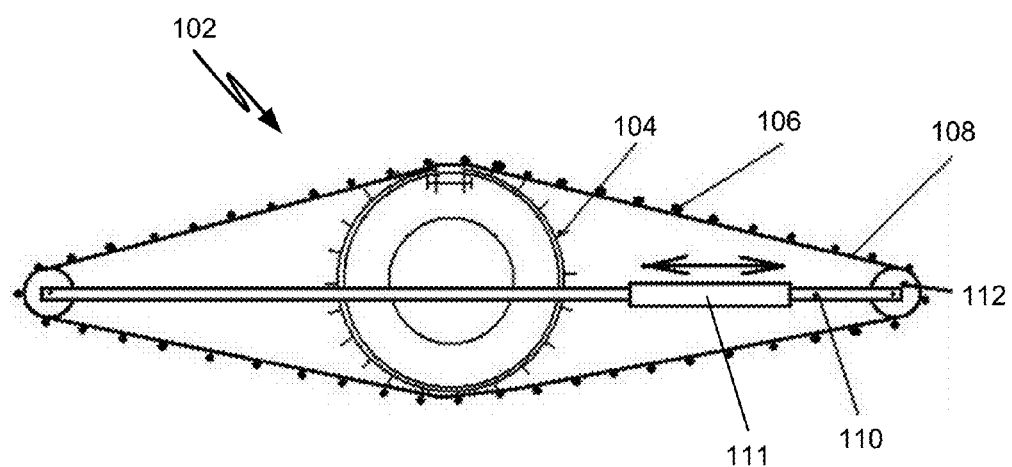
FIG. 2 is a diagram of an exemplary track drive in accordance with at least one embodiment.

FIG. 2 shows the truck track drive 102 in greater detail. The track drive 102 includes drive teeth 104 on an outer tire, tread cleats 106, tread belt 108, tension rod 110 and roller 112.

The tension rod 110 can include a first portion and a second portion, each having a threaded end. The threaded ends can be mated with a spacer 111. The spacer 111 can include internal thread configured to mate with the threaded end portions of the tension rod portions. The spacer can be used to increase tension in the rod by rotating the spacer in a first direction and to decrease tension in the rod by rotating the spacer in a second direction.

Figure 4:
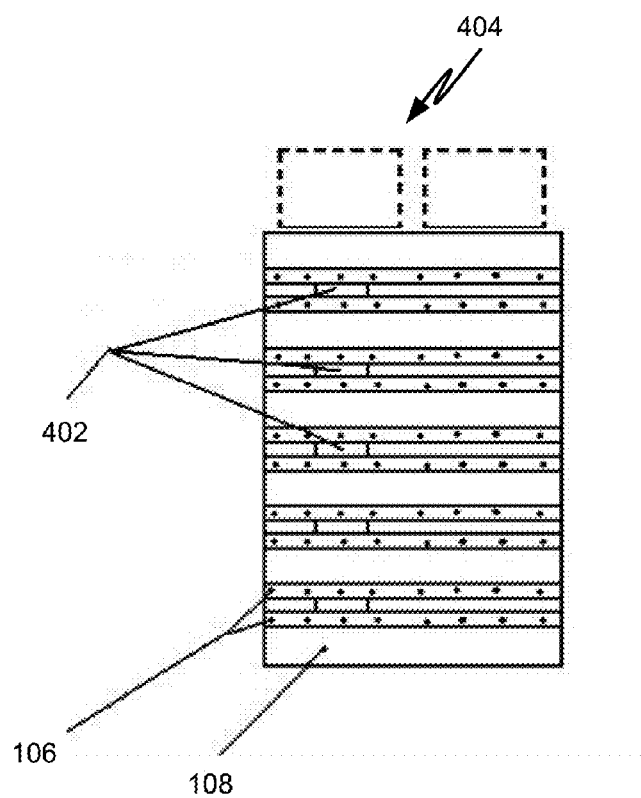
FIG. 4 is a diagram of a tread of an exemplary track drive in accordance with at least one embodiment.

All metallic components and body can be made of steel. The protective panels (see below) can be made from plastic (or from a thin sheet of metal). The bearings can be standard. The tread (or caterpillar) can be made of resin-fabric or resin-metal. FIG. 4 shows a simplified tread having resin-fabric tape 108, on which, with the aid of the bolts or the rivets, are mounted the cleats in the form of longitudinal plates 106, between which there are cuts 402 for the entry in them of the hooks of 104 special external casings.

Figure 3:
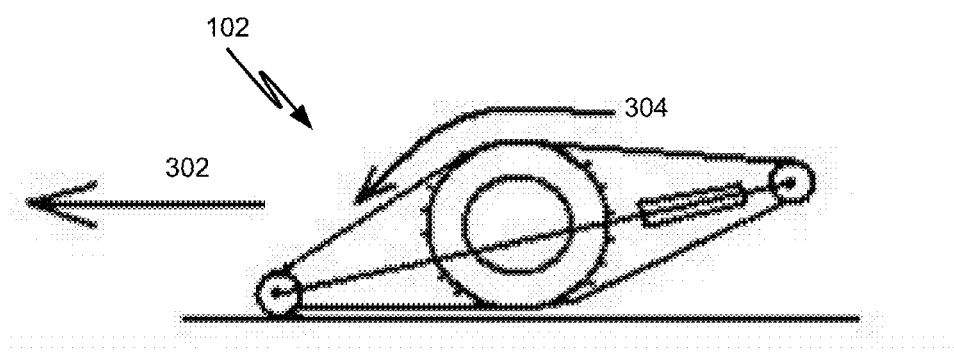
FIG. 3 is a diagram of an exemplary track drive motion in accordance with at least one embodiment.

FIG. 3 is a diagram of an exemplary track drive 102 motion. As the truck moves forward 302, the track drive unit rotates 304 about the wheel axle.

FIG. 4 is a diagram of a tread of an exemplary track drive tread showing the openings 402 in the tread belt configured to accept the outer tire drive teeth 104. It can also be seen that the tread is the width of two tires (shown by dotted lines 404).

Figure 5:
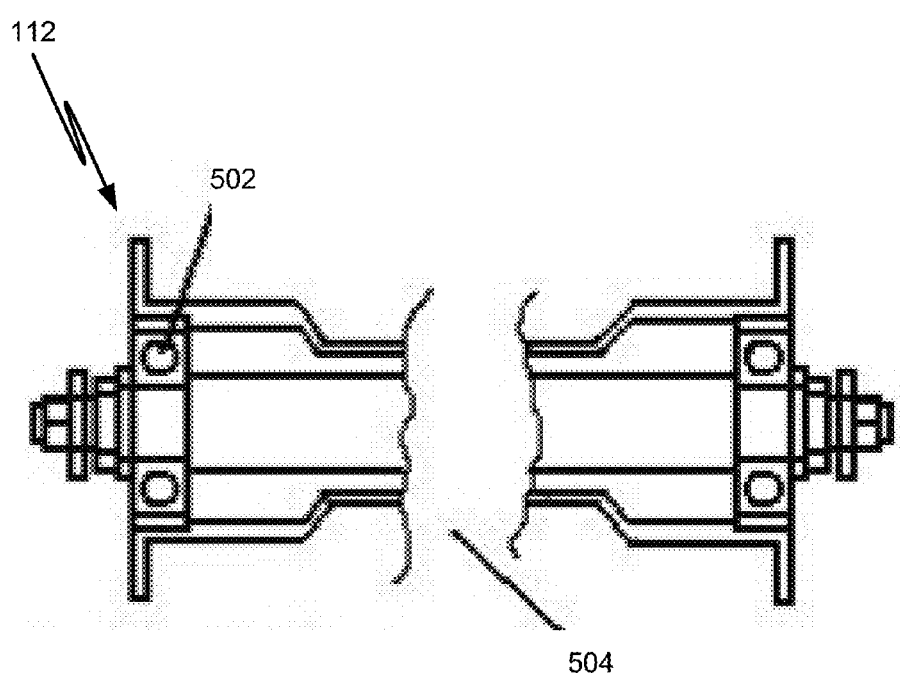
FIG. 5 is a diagram of an exemplary roller in accordance with at least one embodiment.

FIG. 5 is a diagram of an exemplary roller 112 having bearings 502. The roller 112 would have a width 504 to accommodate the width of the tread.

Figures 6A, 6B:
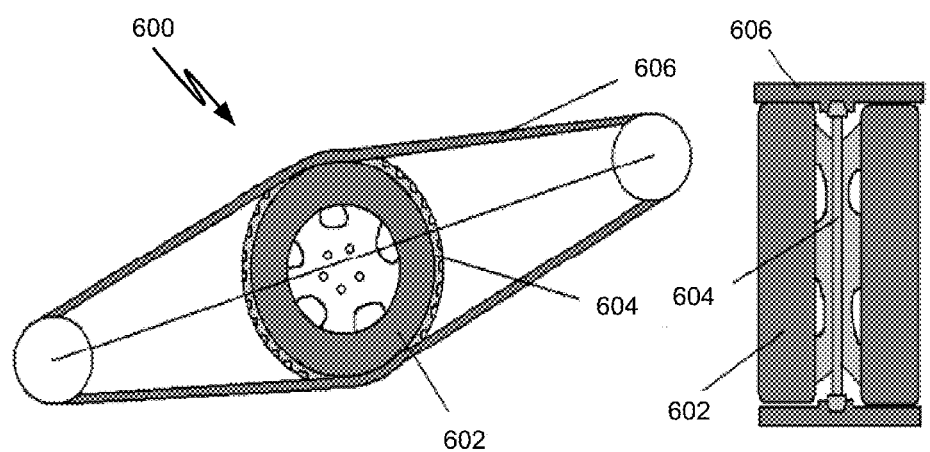
FIGS. 6A and 6B are diagrams of an exemplary track drive having a compulsory drive feature in accordance with at least one embodiment.

FIGS. 6A and 6B are diagrams of an exemplary track drive 600 having a compulsory drive feature that includes a wheel assembly 602, a toothed gear 604 disposed between the rear wheels and a tread having indentions on an inner circumference configured to mate with the toothed gear 604.

Figures 7A, 7B:
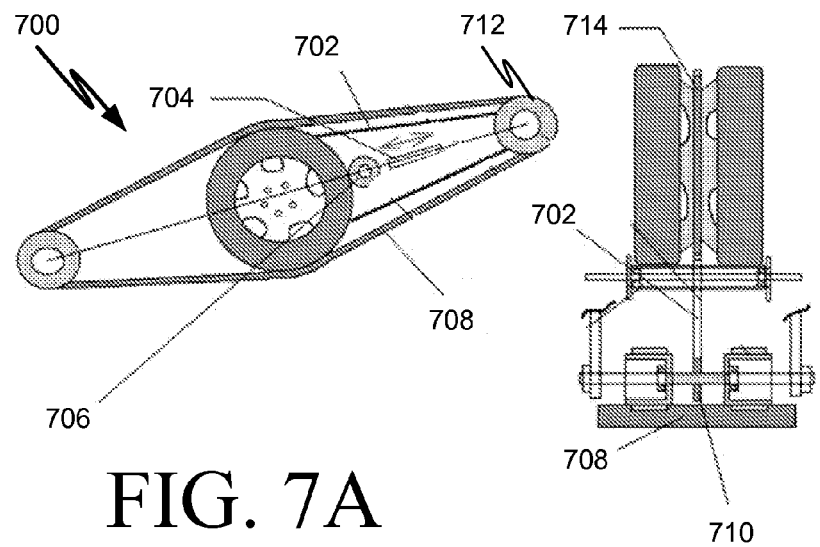
FIGS. 7A and 7B are diagrams of an exemplary track drive having a compulsory drive feature in accordance with at least one embodiment.

FIGS. 7A and 7B are diagrams of an exemplary track drive 700 having a compulsory drive feature including a chain 702, a tread tension arm 704, a tensioner platen 706, a tread 708, a driven gear 710, a roller 712 and a drive gear 714.

In operation, the drive gear 714, disposed between the rear wheels of a rear wheel assembly, drives the chain 702, which in turn powers the driven gear 710 coupled to the roller 712, which powers the tread 708. The tensioner platen 706 acts to keep a desired tension on the chain 702.

Figure 8:
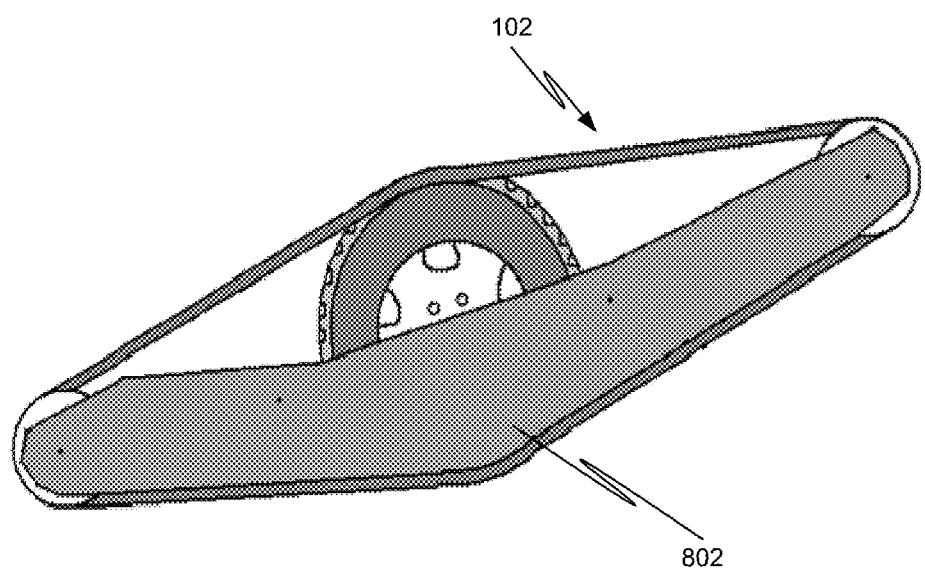
FIG. 8 is a diagram of an exemplary track drive having a mud/debris shield in accordance with at least one embodiment.

FIG. 8 is a diagram of an exemplary track drive 102 having a mud/debris shield 802 to help prevent mud, dirt, debris, snow, ice or the like from interfering with the operation of the track drive. In addition to the partial shield shown, a full shield could be used that covers all or nearly all of the track drive and reduces intrusion of mud, debris, snow, ice or the like. The full shield could be used on both an exterior and interior of the track drive. It will be appreciated that when used on an interior of the track drive a partial or full shield may need to be formed in two parts in order to be placed around the axle of the truck.

It is, therefore, apparent that there is provided, in accordance with the various embodiments disclosed herein, truck track drives.

While the invention has been described in conjunction with a number of embodiments, it is evident that many alternatives, modifications and variations would be or are apparent to those of ordinary skill in the applicable arts. Accordingly, Applicant intends to embrace all such alternatives, modifications, equivalents and variations that are within the spirit and scope of the invention.

What is claimed is:

1. A track drive comprising:
   a first roller disposed at a front end of a tension rod;
   a second roller disposed at a rear end of the tension rod;
   a tread configured to pass over a top and a bottom of a dual rear wheel truck tire assembly and to pass over each of the rollers, the tread being powered by rotation of the dual rear wheel truck tire assembly; and
   a compulsory drive system having a toothed drive gear disposed between a first wheel and a second wheel of the dual rear wheel truck tire assembly, a chain and a driven gear coupled to the second roller, the second roller mechanically engaging the tread and causing it to move when the driven gear is turned.

* * * * *